United States Patent Office.

ALEXR. ROBERTSON ARROTT, OF SAINT HELEN'S, ENGLAND, ASSIGNOR TO JOHN B. MELDRUM, OF NEW YORK, N. Y.

IMPROVED PROCESS OF BLEACHING.

Specification forming part of Letters Patent No. 44,250, dated September 13, 1864.

*To all whom it may concern:*

Be it known that I, ALEXANDER ROBERTSON ARROTT, of Saint Helen's, in the county of Lancaster, England, have invented a new and Improved Process of Bleaching; and I do hereby declare that the following is a full, clear, and exact description thereof, which will enable those skilled in the art to make and use the same.

This invention consists in the employment or use, for the purpose of bleaching vegetable fibers used for textile and other purpose, of a solution containing a bleaching chloride and an alkali, the bleaching being completed in this liquid and the use of free chlorine and the process of boiling and souring altogether avoided, thereby saving the expense of fuel, labor, and material, and the risk of injury from sulphuric acid.

In the ordinary process of bleaching the substance to be bleached, after being subjected to a preparatory process consisting principally of boiling with a solution containing soda or lime, whereby certain matters are removed, is steeped in a solution containing chloride of lime, (though other chlorides are sometimes used,) and when it has become sufficiently impregnated with this solution it is immersed in dilute acid, by which means chlorine is liberated, the coloring-matter is destroyed, and the substance becomes white or bleached by the action of the free chlorine. By using this method of bleaching a considerable loss of weight in the substance results, and in some cases a good white color cannot be obtained without a considerable diminution in the strength of the fiber, besides the loss in weight.

In order to avoid the use of free chlorine and the consequent loss in weight and in strength of fiber, I use a solution of a chloride of an alkali containing, in addition to the alkali in combination with chlorine, a certain amount of caustic alkali, and I prefer, for bleaching flax, hemp, or cotton, that this caustic alkali should be at least in proportion to the amount of chlorine in the solution as five to one hundred; but in the bleaching of jute and similar materials, where much extraneous matter has to be removed, the proportion of caustic alkali present may be largely increased with advantage, even to the extent of twenty-five to one hundred, and in any case the amount of caustic alkali in the solution may be such as would not affect the strength of the material if exposed to its action during the time necessary for bleaching, supposing no chlorine to be used at the same time. The strength of the bleaching-liquid will vary with the nature of the material to be bleached and the temperature at which the process is carried on, high temperatures requiring weaker liquids. The temperature I prefer is 80° to 100° Fahrenheit, and the liquid I prefer to use at this temperature contains two hundred to three hundred grains of chlorine per gallon, though for some materials, where the fiber is strong, this quantity may be increased with advantage.

There are many methods of preparing the bleaching-liquid. One of the most convenient is by passing chlorine into a solution of caustic alkali, whereby chloride of alkali is produced, and adding just such an amount of chlorine as will leave a sufficient quantity of the alkali in a caustic state, along with the chlorine produced, the proportion of these being regulated according to the nature of the material to be bleached; or bleaching-powder may be decomposed by means of carbonate of soda or of potash, a quantity of this being added beyond the amount required to decompose the chloride of lime present in the bleaching-powder. The free lime, which is always present to some extent in the bleaching-powder, converts this excess of carbonate of soda or potash. Lime must be added to the mixture of carbonate of soda or potash and bleaching-powder to produce this effect.

In place of using carbonate of soda or potash to decompose the chloride of lime, sulphate of soda or potash may be used, and carbonate added only in a sufficient quantity to produce the necessary amount of caustic alkali.

Having prepared a bleaching-liquid of proper strength, as before described, I place it in a suitable vessel and steep the material to be bleached in it, taking care that all parts are equally acted on, which can be accomplished by any of the well-known methods in use in the ordinary process of bleaching, and if a sufficient quantity of bleaching-liquid is used the process may be completed in one operation; but, as after some time the action becomes slow, I prefer to remove the material to a quantity of fresh liquid, or to draw off the partially-exhausted liquid, and this change should be repeated till the desired amount of bleaching is obtained. Fresh material requiring to be bleached is then immersed in the partially-exhausted liquid, so that the remaining chlorine may be utilized.

The quantity of chlorine required to bleach a certain weight of material is about ten to fifteen per cent. of its weight; but this will vary with the nature of the material to be bleached and the degree of whiteness required. When the material has become of the desired degree of whiteness it should be removed from the liquid and thoroughly washed in the manner usually adopted.

This invention is applicable to the bleaching of flax, hemp, jute, cotton, or other vegetable material used as a textile material or for the manufacture of paper, and by its application the use of free chlorine is altogether avoided, and the strength and weight of the material are preserved as much as possible.

By my process the fabric or fiber is bleached at one operation by steeping in a solution of a chloride with an excess of alkali, and the ordinary preliminary boiling in a solution of lime or soda, as well as the subsequent immersion in an acid solution to free the chlorine, is avoided, saving the expense of fuel, labor, and material in the avoidance of boiling, as well as the simplification of the apparatus and room required, and saving the cost and the danger in the manipulation of the sulphuric acid, as well as preserving the fabric from the injury it sustains from the development of a peculiar acid by the free chlorine in contact with vegetable matter.

Having thus described my invention, I claim as new and desire to secure by Letters Patent—

The employment or use, for the purpose of bleaching vegetable fibers used for textile fabrics or other purposes, of a solution containing a bleaching-chloride and an alkali mixed together, substantially as herein specified, whereby the bleaching process is completed and boiling and souring may be dispensed with.

ALEXANDER ROBERTSON ARROTT.

Witnesses:
    JOHN MARSH,
No. 10 *Water Street, Liverpool, Accountant.*
    JUSTLY PEARSON,
No. 10 *Water Street, Liverpool, Solicitor.*